(12) United States Patent
Hoshino

(10) Patent No.: US 6,633,702 B2
(45) Date of Patent: Oct. 14, 2003

(54) DEVICE FOR ADJUSTABLE CHIRPING IN-FIBER BRAGG GRATINGS AND METHOD FOR PRODUCING SAME

(76) Inventor: Hiroyuki Hoshino, 1-17-2, Naka-Narusawacho, Hitachi-shi, Ibaragi Pref. 316-0033 (JP)

( * ) Notice: Subject to any disclaimer, the term of this patent is extended or adjusted under 35 U.S.C. 154(b) by 134 days.

(21) Appl. No.: 09/843,910

(22) Filed: Apr. 30, 2001

(65) Prior Publication Data

US 2002/0018619 A1 Feb. 14, 2002

(30) Foreign Application Priority Data

May 2, 2000 (JP) ......................................... 2000-133639
May 31, 2000 (JP) ......................................... 2000-162705

(51) Int. Cl.[7] .............................................. G02B 6/34
(52) U.S. Cl. ........................................ 385/37; 385/137
(58) Field of Search ............................. 385/37, 24, 136, 385/137; 398/87

(56) References Cited

U.S. PATENT DOCUMENTS

| 5,682,445 A | 10/1997 | Smith ............................. 385/7 |
| 5,694,501 A | 12/1997 | Alavie et al. .................. 385/37 |
| 5,774,619 A | 6/1998 | Bruesselbach ............... 385/37 |
| 5,999,671 A | 12/1999 | Jin et al. ...................... 385/37 |
| 6,044,189 A | 3/2000 | Miller .......................... 385/37 |
| 6,295,399 B1 * | 9/2001 | Engelberth .................... 385/37 |
| 6,366,721 B1 * | 4/2002 | Hu et al. ...................... 385/37 |
| 6,370,310 B1 * | 4/2002 | Jin et al. .................... 385/136 |
| 2002/0037125 A1 * | 3/2002 | Yang et al. ..................... 385/2 |

FOREIGN PATENT DOCUMENTS

| GB | 2 286 898 | 8/1995 |
| JP | 2000-137197 | 5/2000 |

OTHER PUBLICATIONS

*Dispersion Tuning of a Linearly Chirped Fiber Bragg Grating Without a Center Wavelength shift by Applying a Strain Gradient*, T. Imai et al., IEE Photonics Technology Letters, vol. 10, No. 6, pp. 845–847, Jun. 1998.
*Chirping optical fibre Bragg gratings using tapered–thickness piezoelectric ceramic*, M. Pacheco et al., Electronics Letters, vol. 34, No. 24, pp. 2348–2350, Nov. 26, 1998.
*Fibre Bragg gratings tuned and chirped using magnetic fields*, J.L. Cruz et al., Electronics Letters, vol. 33, No. 3, pp. 235–236, Jan. 30, 1997.
*Tunable chirping of a fibre Bragg grating using a tapered cantilever bed*, M. Le Blanc et al., Electronics Letters, vol. 30, No. 25, pp. 2163–2164, Dec. 8, 1994.
*Distributed on–fiber thin film heaters for Bragg gratings with adjustable chirp*, John A. Rogers et al., Applied Physics Letters, vol. 74, No. 21, pp. 3131–3133, May 24, 1999.
"Variable–Spectral–Response Optical Waveguide Bragg Grating Filters for Optical Signal Processing", Hill, K. O., et al, *Optics Letters*, vol. 20, No. 12, Jun. 15, 1995, p. 1439.

* cited by examiner

Primary Examiner—Hemang Sanghavi
(74) Attorney, Agent, or Firm—Armstrong, Westerman & Hattori, LLP

(57) ABSTRACT

Disclosed is a device for adjustable chirping in-fiber Bragg gratings comprising a straight beam of a longitudinally uniform cross-section, uniformly bent by an external force in a vertical plane including the axis of the beam, and an optical fiber provided with grating of uniform interval, or those having been chirped in advance at a predetermined rate of interval change, extending straight along said vertical plane in the beam when the beam is not loaded with the external force, from the top surface at one end to the bottom surface at the other end of the beam, penetrating on its way the neutral surface of the beam.

29 Claims, 5 Drawing Sheets

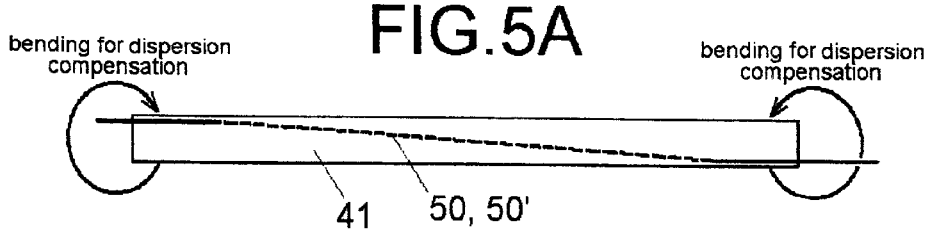
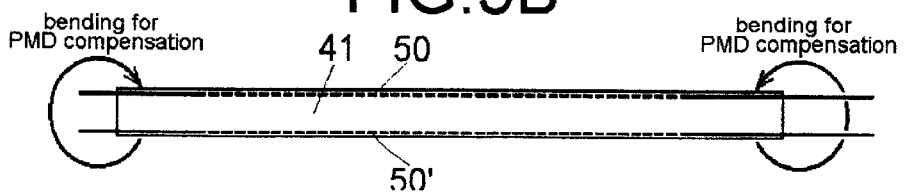
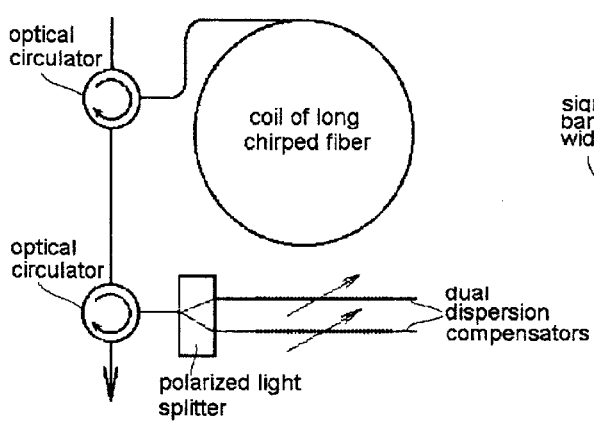
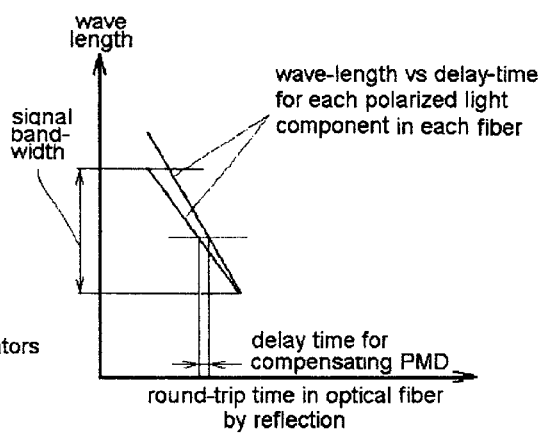
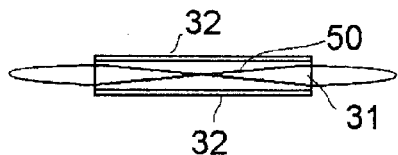
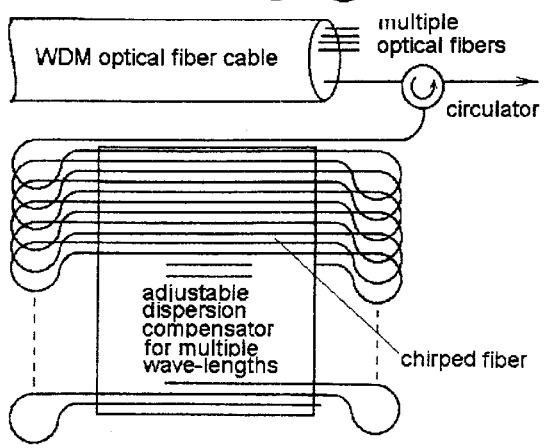

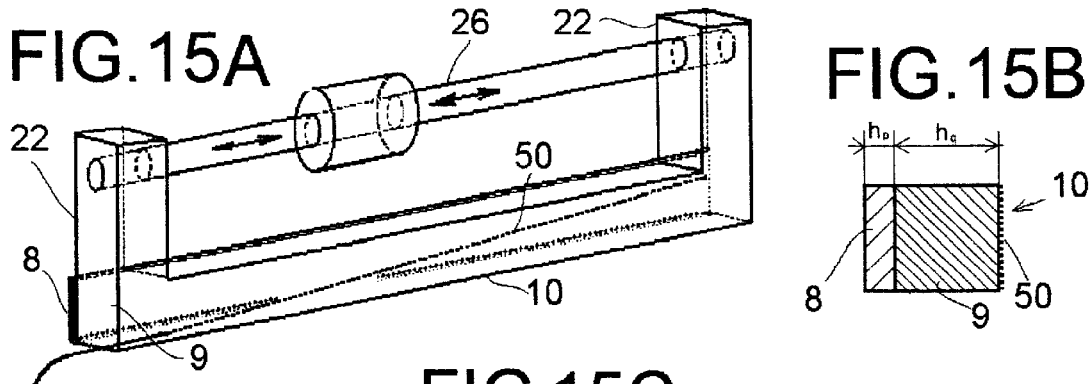
FIG. 15A  FIG. 15B  FIG. 15C
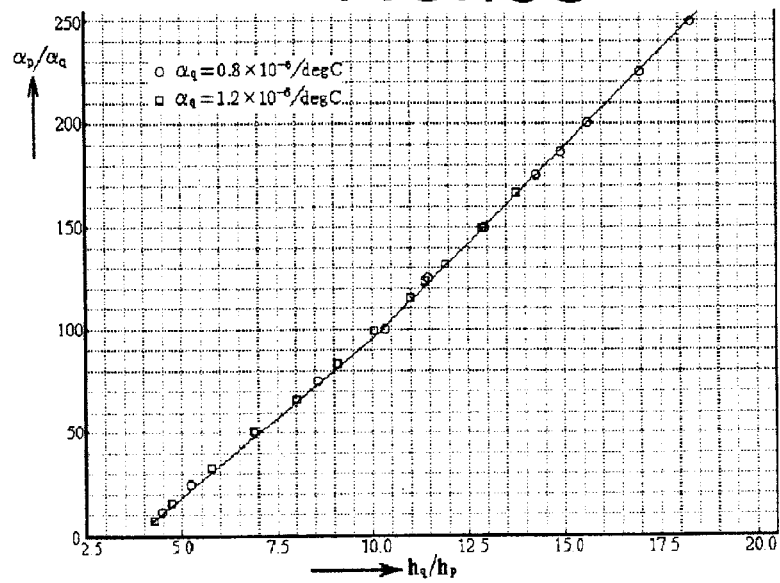
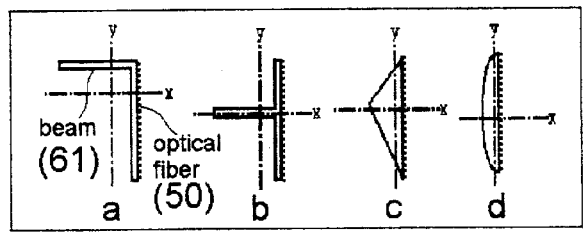
FIG. 16
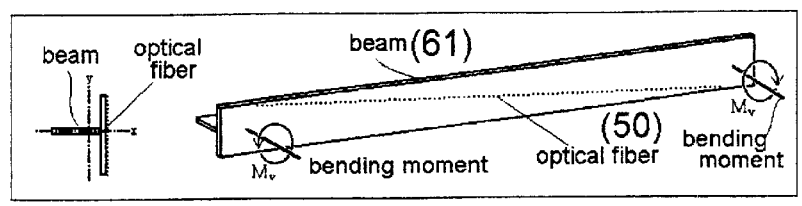
FIG. 17

DEVICE FOR ADJUSTABLE CHIRPING IN-FIBER BRAGG GRATINGS AND METHOD FOR PRODUCING SAME

FIELD OF THE INVENTION

The present invention relates to means for dispersion compensation required for optical communication systems, and specifically to a new device for adjusting the distribution of Bragg gratings along an optical fiber.

BACKGROUND OF THE INVENTION

When modulated light is transmitted through a single mode optical fiber, one of the difficulties is the dispersion of light within the optical fiber. To cope with this difficulty, a dispersion compensation fiber (DCF) has been proposed. However, the DCF has a drawback in that the light transmitting in the DCF suffers a relatively large attenuation. To provide an alternative, an optical fiber with in-fiber Bragg gratings has been developed, in which the interval of the gratings varies continuously depending on the location of the gratings along the optical fiber (hereinafter a "chirped fiber").

The inventor of the present invention owns U.S. Pat. No. 6,160,261 in which an efficient method of producing the chirped fiber is described. Patent applications on the same invention have been made in several countries including Japan. The invention of the above-mentioned U.S. Patent enables production of a chirped fiber having a length over 10 meters with a desired distribution of the gratings. With the patented method, it is possible today to design and produce a dispersion compensator adapted for a communication line of long distance, working under a given spectrum of light, with given dispersion characteristics of the optical fiber and so forth taken into consideration. A dispersion compensator provided with a long chirped fiber over 10 meters is suited for, for instance, a long distance intercity optical communication line.

In recently built optical communication networks, the optical fibers included as network components are switched by wave-guide switches, for instance, to select and combine them with each other. In such a situation, it is desired to compensate for, as quickly and adaptively as possible, the dispersion in respective optical fibers used in a narrow band such as a single channel in the WDM system.

To practice the adaptive dispersion compensation mentioned above, it is necessary to be able to freely adjust the interval of the gratings included in the dispersion compensators. There have been many proposals until now about how to realize an adjustable chirped fiber.

Conventional Technology 1

A method for producing an adjustable chirped fiber by utilizing thermal expansion/contraction is presented in John A. Rogers et al; Distributed on-fiber thin film heaters for Bragg gratings with adjustable chirp, American Inst. of phys., Vol 74, No. 21, May 24, 1999. In this method, the optical fiber is plated with metal, and the thickness of the metal layer is controlled so that a temperature distribution is produced in the axial direction of the optical fiber with the electric current applied to the metal layer, thereby changing the distribution of the gratings in the optical fiber.

As well as those utilizing physical phenomena other than thermal expansion, there is at least one with piezoelectricity (Electro. Lett. Vol. 34, No. 24, Nov. 24th, 1998), and another which relies on magnetostriction (Electro. Lett. Vol. 33, No. 3, Jan. 30th, 1997).

Conventional Technology 2

There are several examples in which bending of a beam is utilized. M. L. Blanc et al; Tunable chirping of a fibre Bragg grating using a tapered cantilever bed, Electro. Lett. Vol. 30, No. 25, Dec. 8th, 1994, which discloses a cantilever whose width and thickness is gradually reduced in a taper toward the root thereof. A groove is formed on the top surface of the cantilever, and the optical fiber is fixed with adhesive to the bottom of the groove. When the cantilever is loaded with a bending force at the tip thereof, the optical fiber is subjected to a stress, the magnitude of which varies linearly in the axial direction of the optical fiber. With the bending force of a certain magnitude, the distribution of the gratings in the optical fiber can be maintained in a corresponding state. However, the wave-length of light reflected by the mid-point of the optical fiber, namely the central wave-length, shifts depending on the magnitude of the bending force. Therefore, a disclosed fiber Bragg grating is inconvenient for use in dispersion compensation.

Conventional Technology 3

T. Imai et al; Dispersion Tuning of a Linearly Chirped Fiber Bragg Gratings Without a Center Wavelength Shifts by Applying a Strain Gradient, IEEE photonics Technology Lett. Vol. 10, No. 6, June 1998, discloses another example in which bending of a beam is utilized. In this case, an optical fiber is held in a plastic cylinder which is adhered to the top surface of a metal beam.

The beam is given a set of bending moments rotating in the same direction at each end of the beam so that the beam is deformed in an S figure. The deformation is null at the mid-point of the beam, whereas, it becomes gradually larger toward both ends of the beam, with a stretching stress exerting on the top surface on one side of the mid-point, and a compressing stress on the other side.

Therefore, while the distribution of the gratings in the optical fiber changes depending on the magnitude of the bending moments, the shifts of the central wave-length do not occur.

In the disclosed beam, a set of bending moments rotating in the same direction are produced by shifting both clamps gripping the ends of the beam, raising one clamp and lowering the other in the vertical direction. Some slippage of the optical fiber in the cylinder, presumably due to incomplete adhesion, was reported.

Problems in Conventional Technologies

A common requirement observed in the conventional technologies raised above is to provide the strain to be applied to the optical fiber with a gradient. In the conventional technology 1, an elaborate means was devised to produce the gradient in the thermal strain (or piezoelectric, magnetostrictive strain), essentially, to have no connection with the gradient. In the conventional technologies 2 and 3 special means such as a unique shape of the beam, or a unique way of moving the clamps, were devised. With these, complexity was introduced into the respective structures.

Specifically speaking with the conventional technology 3, in the disclosed way of shifting the clamps to produce the bending moments, a drawback may arise in that a substantial distance change between the clamps could be created by shifting, and an axial tension caused in the beam. This would cause a shift in the point of no expansion or compression in the optical fiber. Further, if the clamps made contact with the beam in the small contact areas, there would be a possibility that the contact state between the clamps and the beam would become unstable due to fatigue of the material. This in turn would affect the balance of the bending moments at both ends of the beam.

How to fix the optical fiber in the beam is another problem in the conventional technologies 2 and 3. In the respective ways of fixing the optical fiber in the beam disclosed, the radial symmetry of the optical fiber in the substance of the beam would not necessarily be secured, and this would make it difficult to tell what kind of force was actually working on the optical fiber.

Still another problem is how to compensate for the thermal expansion of the beam. Plastics as the material of the beam generally show a far greater expansion coefficient than that of metals. In contrast, a metal beam requires a far greater force ell to produce a predetermined strain on the optical fiber, compared to a plastic beam. It is therefore necessary to find how to compensate for the thermal expansion of the plastic beam. However, there is no such disclosure in the conventional technologies.

SUMMARY OF THE INVENTION

The present invention provides a simple device for dispersion compensation, in which an optical fiber provided with normally (when no bending force is loaded on the beam) uniform gratings fixed in a beam is subjected to tension or compression when the beam is bent. This depends on the axial location in the beam of the observed point of the optical fiber, and as a result, the interval of the gratings can be varied continuously in the axial direction of the optical fiber (in short, "chirped"). Chirping of the gratings may be adjusted by adjusting the extent of the bending of the beam.

The device according to the present invention comprises:
- a straight beam having a longitudinally uniform cross-section, uniformly bent by external force in a vertical plane including the axis of the beam, and
- an optical fiber provided with gratings, extending straight along said vertical plane in the beam when the beam is not loaded with the external force, from the top surface at one end to the bottom surface at the other end of the beam, penetrating on the way the neutral surface of the beam.

When a straight beam is bent, a strain is produced in the beam, the magnitude of which varies linearly, from negative to positive values depending on which side of and how distant it is from a neutral surface. If an optical fiber is fixed obliquely in the beam so that it penetrates the neutral surface on its way, portions of the optical fiber existing on the convex side of the neutral surface in the bent beam are subjected to tension, and on the concave side, compression, whereas no tension nor compression is present at the cross-point with the neutral surface.

Accordingly, if an optical fiber placed in the beam is provided with gratings of uniform interval, the uniform gratings change into chirped gratings, by simply bending the beam, while the intervals vary continuously in the axial direction. As a result, the range of wave-lengths of light reflected by the gratings is expanded from a sharp point to a band including higher and lower wave-lengths on both sides of a central wave-length. However, in the course of changing, the central wave-length remains unchanged, because, the light of the central wave-length is reflected by the optical fiber at or near the cross-point with the neutral surface, where the interval of the optical fiber remains unchanged.

If the optical fiber is provided with gratings chirped in advance, it reflects light of a predetermined band of wave-lengths, without bending of the beam. However, it is possible to adjust the bandwidth by exerting an appropriate bending force upon the beam.

In the above-mentioned device, as the optical fiber is buried deep in the substance of the beam, the radial symmetry of the optical fiber is secured, and there is little boundary effect between the beam and the optical fiber. The optical fiber is given almost genuine axial force from the environment, and is dynamically stable. Further, as the radial symmetry of the optical fiber is stably maintained, there is little danger of suffering from a polarization mode dispersion (PMD), which is caused by polarized light speeds dependent on the asymmetric strain of the fiber glass.

As stated above, in the device according to the present invention, the distribution of gratings in the axial direction of the optical fiber can be easily adjusted by a simple procedure such as exerting a uniform bending force onto the straight beam. This device is suited, for instance, for quickly and adaptively compensating for dispersion suffered by an individual narrow band channel such as a single channel in a WDM system.

Fifteen preferred embodiments are provided in the description. The first to eighth embodiments show variations to the above-mentioned device. The ninth and tenth embodiments show temperature compensating means applicable to the above-mentioned device. The eleventh and twelfth embodiments show similar devices including beams which have special cross-sections. The thirteenth to fifteenth embodiments show methods for producing the disclosed devices.

BRIEF DESCRIPTION OF THE DRAWING

The present invention can be further understood by reference to the following description and attached drawing which illustrates the preferred embodiments. In the drawing.

FIGS. 5A and 5B illustrate a beam containing two optical fibers, bent in the two perpendicular directions, proposed in the fifth preferred embodiment of the present invention;

FIGS. 6A and 6B illustrate a device for compensating for the dispersion accompanied by polarization mode dispersion (PMD), proposed in the fifth preferred embodiment of the present invention;

FIG. 7 illustrates a straight beam containing a multiplicity of optical fibers, proposed in the sixth preferred embodiment of the present invention;

FIG. 8 illustrates an adjustable dispersion compensator for multiple wave-lengths as an application of the straight beam illustrated in FIG. 7;

FIGS. 15A, 15B and 15C illustrate a straight beam provided with a temperature compensating function in itself, proposed in the tenth preferred embodiment;

FIG. 16 illustrates examples of thin wall cross-sections of beams, proposed in the eleventh preferred embodiment; and FIG. 17 illustrates a process of forming pre-chirped gratings in the optical fiber fixed on the surface of the beam, proposed in fourteenth and fifteenth preferred embodiments.

DESCRIPTION OF THE PREFERRED EMBODIMENTS

First Embodiment

In the first embodiment of the device according to the present invention, a device provided with a means for applying bending moments to the beam, is proposed.

Figure 1:
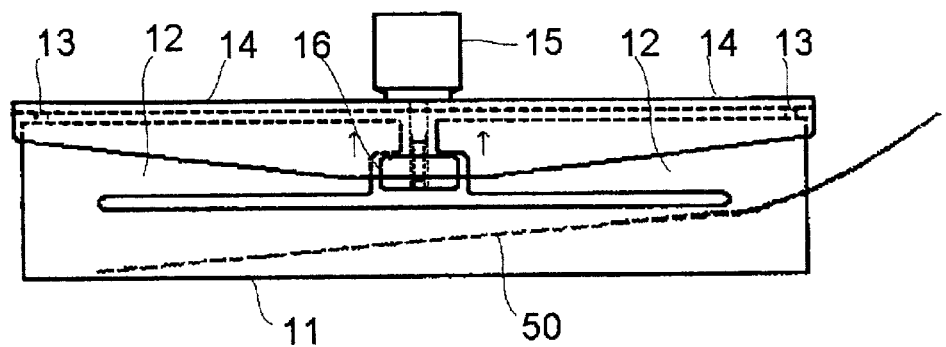
FIG. 1 illustrates a straight beam provided with a means for bending the beam, proposed in the first preferred embodiment of the present invention.

FIG. 1 illustrates a straight beam 11 provided with a pair of arms 12, as a means for applying bending moments to the beam 11, each arm extending in a vertical plane including the axis of the beam 11, parallel to the beam 11 from the same side of respective ends of the beam 11 to the center thereof, having two tips facing each other at the center of the beam 11.

In the straight beam 11, an optical fiber 50 is fixed obliquely, extending along the above-mentioned vertical plane, straight from the top surface at one end to the bottom surface at the other end of the beam 11 when the beam 11 is not loaded with an external force. This penetrates on its way, the neutral surface of the beam 11.

A mechanism is attached to the beam 11 for moving the tips of the arms 12 toward or away from the beam 11, thereby providing the beam 11 with bending moments at both ends. This comprises a screw-nut arrangement 16 and a motor 15, mounted at the center of a yoke 14, placed apart from the arms 12 between the pair of protrusions 13 provided at the respective joints for the arms 12.

The straight beam 11 is given a set of almost genuine bending moments at both ends thereof, without any axial force. Therefore, if the beam 11 is vertically symmetric, a neutral surface is generated at ½ the height of the beam 11. Under these conditions, as the optical fiber 50 is intersected at the mid-point thereof by the neutral surface, the interval of the gratings at and near the mid-point is maintained unchanged.

As fulcrums for applying the bending moments to the beam 11 are provided within the device, there is no need to acquire them outside from the device, and therefore, any posture can be freely employed by the device. It is preferable to fabricate the device with the beam 11 and the arms 12 unified in the body. Ths can be realized by integrally forming the device by casting or by cutting it out from a board or a plate.

After a preferable distribution of the gratings has been attained through action of the screw-nut arrangement 16 and the motor 15, it is possible to maintain the attained conditions without consuming energy, by simply stopping the motor 15.

The present embodiment corresponds to claims 2, 5 and 6.

Second Embodiment

In the second embodiment of the device according to the present invention, a device provided with another means for applying bending moments to the beam, is proposed.

Figure 2A:
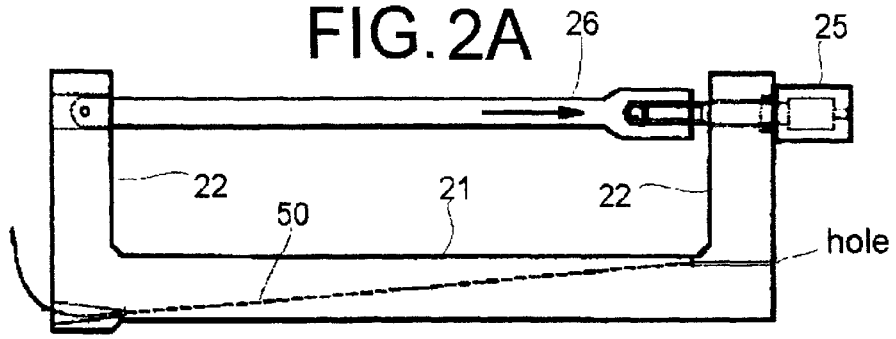
FIGS. 2A, 2B and 2C illustrate a straight beam provided with another means for bending the beam, proposed in the second preferred embodiment of the present invention;.

FIG. 2A illustrates a straight beam 21 provided with a pair of arms 22 of equal length for applying bending moments to the beam. The arms 22 extend perpendicularly to the beam from the same side of the respective ends of the beam, in a vertical plane including the axis of the beam 21.

In the straight beam 21, the optical fiber 50 is fixed, penetrating on its way the neutral surface of the beam, in the same manner as in the first embodiment.

The tips of the arms 22 are connected to each other via a screw-nut arrangement 26 driven by a motor 25, to effect the distance between the tips to be widened or narrowed, thereby applying a set of bending moments to the respective ends of the beam 21. However, it should be noted that, in this configuration, an axial force as a reaction of the force produced by the screw-nut arrangement 26 and the motor 25, which is tension or compression, is applied to the beam 21, together with the bending moments.

Figure 2B:
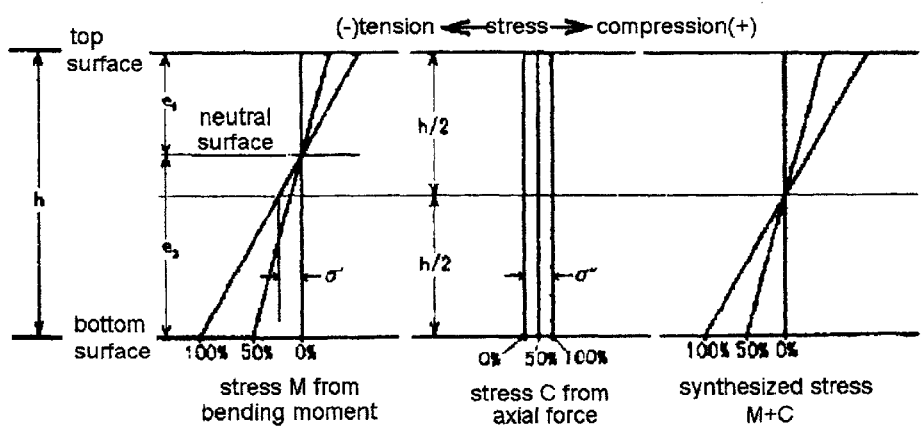

FIG. 2B illustrates the distribution of stresses in the beam 21. The ordinate represents a vertical location (or level) in the beam, and the abscissa represents the directions and magnitude of the stresses (tension directs the left, compression, the right). The diagram on the left of FIG. 2B illustrates the stresses generated from the bending moments applied to the beam 21. The diagram in the middle illustrates the stresses generated from the axial force in the beam 21. And, the diagram on the right illustrates the synthesized stresses in which the stresses from the bending moments and those from the axial force are synthesized.

Figure 2C:
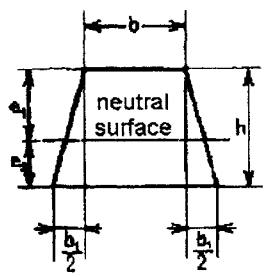

As illustrated, the stresses generated by the genuine bending moments become zero at the height of the neutral surface, which is given by the nature of the section figure. However, the synthesized stresses become zero at a location other than the height of the neutral surface. It is preferable that the mid-point of the optical fiber 50 meets the level where the synthesized stresses become zero. In order to fulfil this requirement, a vertically asymmetric cross-section of the beam 21 is assumed, as illustrated in FIG. 2C. In addition, the length of the arms 22 is determined from a requirement that the synthesized stresses should become zero at ½ the height of the beam 21.

The length L of the arms 22 which meets the above requirement is given by the following formula:

$$L = \frac{I}{A(h/2 - e_1)}$$

where, I is the second moment of inertia around the neutral axis, A the cross-section of the beam, h the thickness of the beam, and $e_1$ the vertical location of the neutral surface in the beam.

After a preferable distribution of the gratings has been attained through action of the screw-nut arrangement 26 and the motor 25, it is possible to maintain the attained conditions without consuming energy, by simply stopping the motor 25.

The present embodiment corresponds to claim 3.

Third Embodiment

In the third embodiment of the device according to the present invention, a device provided with still another means for bending the beam, is proposed.

Figure 3A:
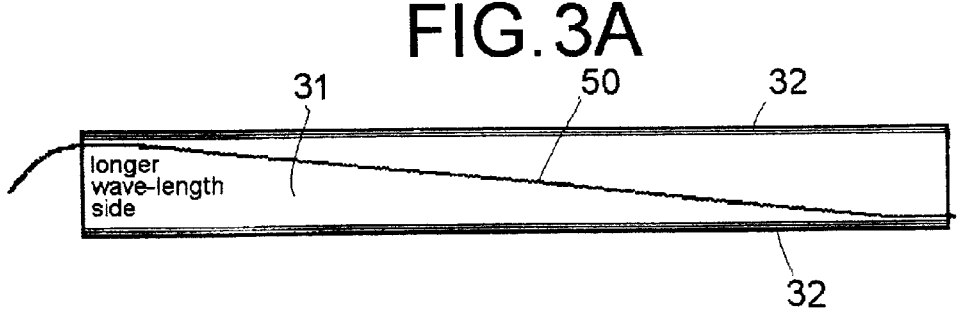
FIGS. 3A, 3B and 3C illustrate a straight beam provided with a pair of flexible flat heaters on the top and bottom surfaces thereof as a means for thermally bending the beam, proposed in the third preferred embodiment of the present invention.
Figure 3B:
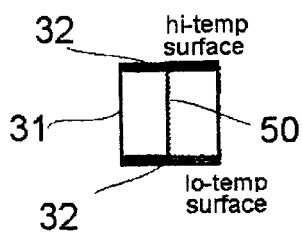
Figure 3C:

FIG. 3A illustrates a straight beam 31 having a rectangular cross-section, made of a heat-resistant plastic. FIG. 3B shows the rectangular cross-section of the beam 31. The top and bottom surfaces of the beam 31 are covered with a pair of flexible flat heaters 32, a plan of which is shown in FIG. 3C. Each of the heaters 32 is supplied with electric power independent of each other to provide different temperatures to the respective surfaces of the beam 31, thereby thermally bending the beam 31. An example of how to supply electric power to the heaters 32 is to supply it in pulses, with altered duty ratios for the respective heaters 32.

In the straight beam 31, an optical fiber 50 is fixed, penetrating on its way the neutral surface of the beam 31, in the same manner as in the first and second embodiments.

The present embodiment corresponds to claim 4.

Fourth Embodiment

In the fourth embodiment of the device according to the present invention, a device provided with a means for preventing the interference caused by double reflection at and near the end of the gratings suffered by the optical fiber, is proposed. The average refractive index per length of gratings near the short wave-length side end is made higher than that of the rest of the fiber gratings.

Figure 4:
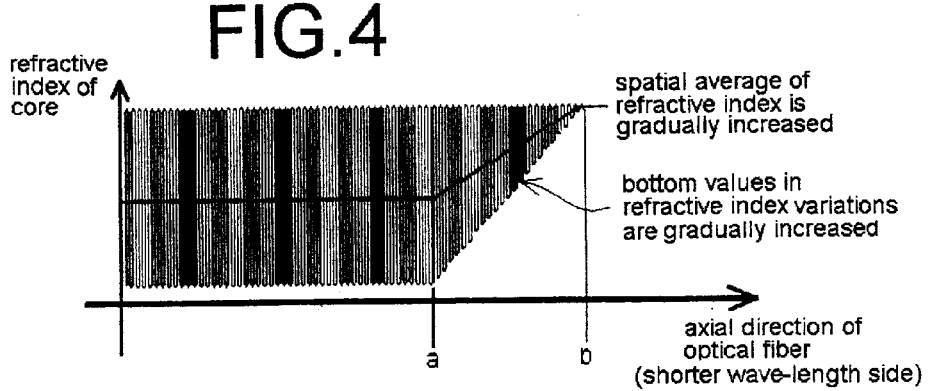
FIG. 4 illustrates an example of detail variations of the refractive index in the optical fiber core.

FIG. 4 illustrates an example showing details of the variations of the refractive index in the optical fiber core, in which the variation amplitudes of the refractive index are reduced, while the average of the refractive indices is enhanced near the end of the gratings in the optical fiber.

The advantage of employing this disclosed enhancement of the grating end is explained. The gratings in the optical fiber are formed by periodically modifying the refractive index of the core with ultra-violet irradiation. However, the intensity of the ultra-violet rays can not be maintained level near the end of the optical fiber, where the refractive index as a spatial average shows a decreasing tendency if the ultra-violet irradiation is decreased solely near the end of the gratings. The wave-length of light reflected (tuned) by the gratings in such a region of the optical fiber becomes relatively lower than that expected from the given interval of the gratings. This may cause duplication of the tuned wave-length with that tuned in from another part of the optical fiber.

This duplication of the tuned wave-length is harmful because it causes an abnormal reflection. To avoid this, the average refractive index per length of the short wave-length side gratings near the end of optical fiber is made higher than that of the middle portion of the optical fiber. This is realized by altering the ultra-violet irradiation near the end portion of optical fiber. The crest strength of the ultra-violet rays is to be maintained, while the bottom strength is enhanced toward the end of the gratings. With this measure, the average refractive index of the core in the part under attention of the optical fiber becomes greater, and this is accompanied by a shortened wave-length of the reflected light, so abnormal reflection is avoided.

The present embodiment corresponds to claim 7.

Fifth Embodiment

In the fifth embodiment of the device according to the present invention, a device having a straight beam containing two optical fibers, is proposed. The beam is bent simultaneously in two directions perpendicular to each other.

FIG. 5A is a side-view showing the straight beam 41 containing two optical fibers 50, 50', and FIG. 5B is a plan showing the same beam 41. The beam 41 is bent in the vertical and horizontal directions simultaneously, with external forces working independently of each other. The optical fibers 50, 50' are provided with gratings of uniform interval, reflecting light of wave-lengths different from each other by a predetermined value, fixed in the beam 41 so as to penetrate the neutral surface corresponding to bending of the beam 41 in the vertical direction.

The device proposed in the present embodiment is suited for compensating for polarization mode dispersion (PMD). The light transmitted in the optical fiber has a tendency to split into two polarized light components (polarization modes) which are perpendicular to each other, due to product quality factors and various environmental factors acting on the optical fiber. Each polarization mode exhibits differing group propagation velocities in the optical fiber, causing the PMD.

To compensate for the usual dispersion accompanied by PMD, it is necessary to separate the two polarization modes through a polarized light separator, and then, to compensate for the usual dispersions on the respective polarization modes. It is thus clear that, as illustrated in FIG. 6A, to compensate for the usual dispersion accompanied by the PMD, two compensators are needed.

The device proposed in the present embodiment contains two dispersion compensators combined into one, in which the two optical fibers 50, 50' make respective dispersion compensators. In this device, as illustrated in FIG. 6B, the delay times for the respective dispersion compensators can be adjusted independently, with the beam 41 being bent in two perpendicular directions, independently.

The present embodiment corresponds to claim 8.

Sixth Embodiment

In the sixth embodiment of the device according to the present invention, a device having a straight beam containing a multiplicity of optical fibers is proposed.

FIG. 7 is a side-view showing the straight beam 31 containing multiple optical fibers 50, and covered with a set of flat heaters 32 on the top and bottom surfaces thereof. The straight beam 31 and the flat heaters 32 are identical with those proposed in the third embodiment, except that the straight beam 31 in the present embodiment contains multiple optical fibers 50.

FIG. 8 illustrates an application of the device proposed in the present embodiment, in which a plan showing the beam 32 is included. In the drawing, the width (the dimension perpendicular to the optical fiber) of the beam 32 is emphasized for illustration expedience. The multiple optical fibers 50 are connected in a cascade to create a very long one. In every intermittent section lying in the beam 31 of the very long optical fiber 50, the gratings for dispersion compensation are provided, corresponding to their respective allocated band-widths in the WDM system. Accordingly, the device proposed in the present embodiment is useful as an adjustable dispersion compensator for multiple wave-lengths.

When the device illustrated in FIG. 8 is subjected to a uniform bending force with different temperatures applied to the top and bottom surfaces of the beam 31, the optimum dispersion compensation in every section of the gratings for the respective allocated band-widths in the WDM system may be realized by simultaneous chirping of the respective sections of the gratings.

The present embodiment corresponds to claim 9.

Seventh Embodiment

In the seventh embodiment of the device according to the present invention, a device provided with a means for detecting the extent of bending of the beam, is proposed.

Figure 9:
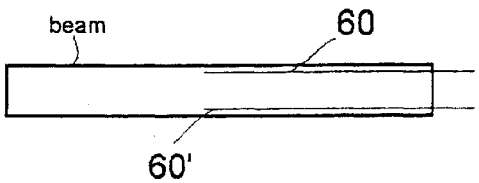
FIG. 9 illustrates a straight beam provided with a means for detecting the extent of bending of the beam, proposed in the seventh preferred embodiment of the present invention.
Figure 10:
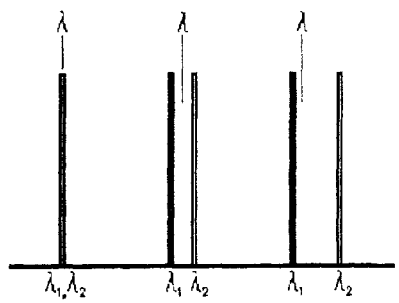
FIG. 10 illustrates the peaks of the reflected light produced by the means illustrated in FIG. 9.

FIG. 9 illustrates the straight beam having optical fibers 60, 60' fixed on the top and bottom surfaces thereof, respectively, in addition to the optical fiber 50 for dispersion compensation (not illustrated). The two optical fibers 60, 60' reflect the light of the identical wave-lengths when the beam is not bent. However, when the beam is bent, one of the optical fibers 60, 60' is compressed, while the other is stretched, and as a result, as shown in FIG. 10, the wave-lengths of the reflected light are separated into two peaks When the state of bending is normal, the separate peaks occupy symmetrical positions with respect to the original one. However, if the separate peaks occupy asymmetrical positions, abnormality in the bending is suspected.

The present embodiment corresponds to claim 10.

Eighth Embodiment

In the eighth embodiment of the device according to the present invention, a device in which the optical fiber has a unique distribution of gratings is proposed (not illustrated).

In the proposed device, the beam has a vertically symmetric cross-section, and the neutral surface of the beam intersects the optical fiber at the mid-point thereof, and while the optical fiber has no grating in a central section of a predetermined length, which is symmetric with respect to the mid-point, the optical fiber is provided with gratings of uniform interval in a pair of sections abutting on both sides of the central region.

The light with all the wave-lengths, passes through the central region of the optical fiber. However, both abutting sections provided with the gratings of uniform interval reflect the light of a specific wave-length corresponding to the gratings.

When the beam is bent and the gratings are chirped, both abutting sections become to reflect the light of the band of wave-lengths, whereas the central section remains to be a transparent window. This means that while the light of the band of wave-lengths is prohibited from passing through both abutting sections, the light with the rest of the wave-lengths can freely pass through the central section. Accordingly, an adjustable band-pass filter is realized, in which the pass-bandwidth can be adjusted by adjusting the magnitude of the bending moments applied to the beam.

If the gratings are chirped in advance, the optical fiber produces the band-pass filter without any bending moment exerted to the beam. However, it is possible to adjust the pass-bandwidth by applying appropriate bending moments on the beam.

It is worthy to note that the gratings in both sections abutting on the central section are required to connect smoothly with imaginary gratings in the central section. One way to fulfil the above requirement, when the optical fiber i s irradiated with ultra-violet rays through a photomask capable of producing the gratings of uniform interval, or gratings chirped in advance at a predetermined rate of interval change, over the entire effective length of the optical fiber, is to selectively blind the part of the photomask covering over the central section of the optical fiber, from the ultra-violet rays.

The present embodiment corresponds to claims 11 and 12.

Figure 11:
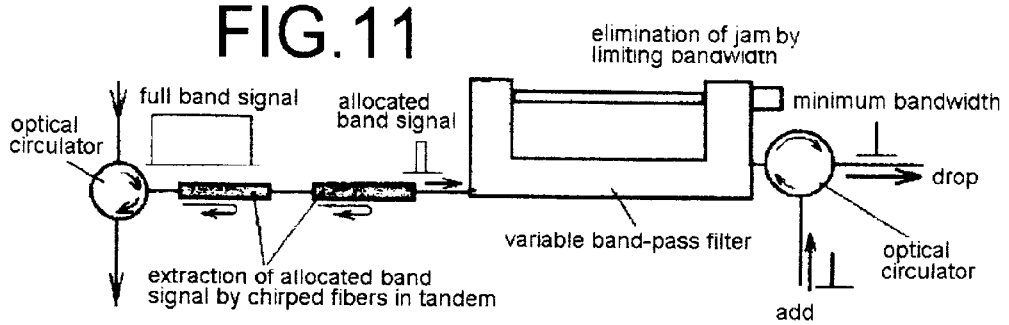
FIG. 11 illustrates an application of a band-pass filter proposed in the eighth preferred embodiment of the present invention.
Figure 12:
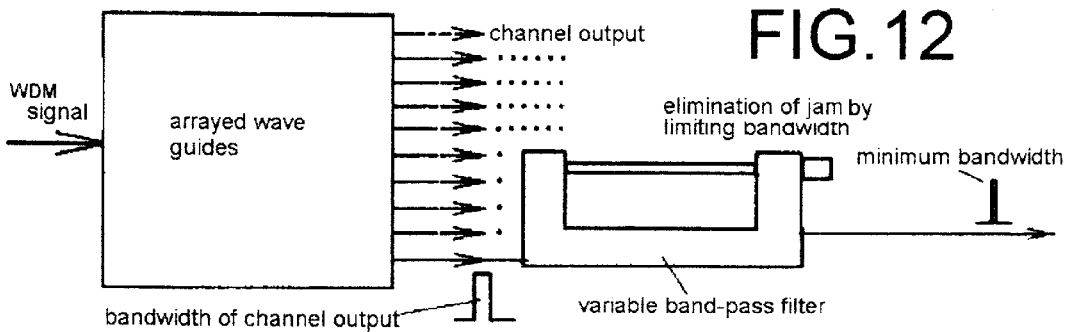
FIG. 12 illustrates another application of the band-pass filter proposed in the eighth preferred embodiment of the present invention.

FIGS. 11 and 12 illustrate two applications of the band-pass filter proposed in the present embodiment.

In FIG. 11, a full-band signal is taken out of an optical circulator inserted into the communication line, and consecutively, an allocated band signal is extracted through duplicated fixed-type chirped fibers in tandem. As the allocated band is still excessively wide, the bandwidth is limited to the minimum by the adjustable band-pass filter proposed in the present embodiment. Another optical circulator is provided on the output side of the band-pass filter, and a narrow band signal is added to or dropped from the main communication line.

FIG. 12 illustrates a WDM system including the adjustable band-pass filter proposed in the present embodiment, connected to one of channel output, terminals from the arrayed wave guides placed at the receiving end of the system. The bandwidth of the signal taken-out of the channel output terminal is still excessively wide, but is limited to the minimum by the adjustable band-pass filter.

Ninth Embodiment

In the ninth embodiment of the device according to the present invention, a temperature compensator which is preferably combined with the straight beam contained in the device according to the present invention is proposed.

Figure 13:
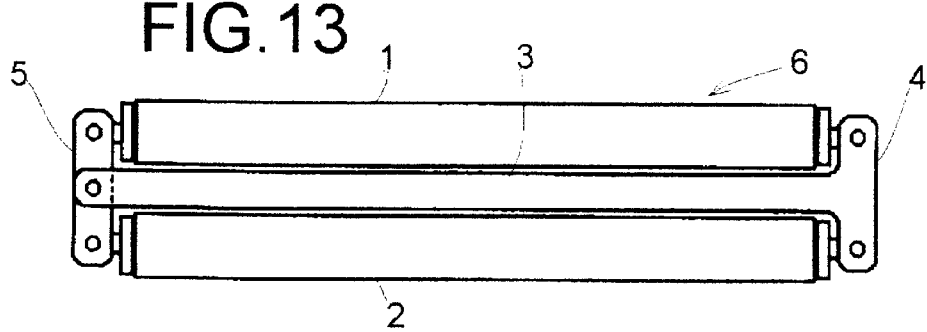
FIG. 13 illustrates a temperature compensator proposed in the ninth preferred embodiment, to be combined with the straight beam in the device according to the present invention.

The temperature compensator 6, illustrated in FIG. 13, comprises a first beam 1 which is another name of the straight beam provided in the device according to the present invention, a second beam 2 which is the same as the first beam 1 except for having a cross-section larger than that of the first beam 1, and a third beam 3 having a larger modulus of elasticity and a smaller coefficient of expansion than those of the first beam 1, wherein the first and second beams 1, 2 are arranged parallel on both sides of the third beam 3, in a plane including the axis of the third beam 3, with respective tips of the beams on the same end firmly tied to a tie-bar 4, and respective tips on the other end fixed so as to tilt to a balancer 5, and wherein the cross-section of the third beam 3is determined so that the length of the first beam 1 is maintained invariable at any temperature.

Responses of the first to third beams 1, 2, and 3 to a temperature change are considered. The first and second beams 1, 2, having the same lengths and coefficients of expansion, produce the same expansion in response to a temperature rise, for instance, and exert a compressive force on each other via the balancer 5. However, the extent of contraction due to the compressive force in the beam 1 having a smaller cross-section is greater than that of the second beam 2, resulting in contraction of the length of the first beam 1 due to the temperature rise.

On the other hand, the third beam 3 expands by itself in response to the temperature rise, as well as by being pulled by the first and second beams through the balancer 5. The expansion of the third beam 3 acts in the direction to lighten the effect of the compressive force on the first beam 1, because the third beam 3 lies between the first and second beams 1, 2 via the balancer 5. Accordingly, the extent of expansion in the third beam 3 can be appropriately adjusted, by adjusting the cross-section thereof, so that the length of the first beam 1 is maintained invariable at any temperature.

The cross-section $A_3$ of the third beam 3 which meets the requirement stated above is given by the following formula:

$$A_3 = \frac{2 \sim A_1 Z_3 \alpha_1}{\frac{(A_2 - A_1) Z_1 \alpha_1}{2 \sim A_2} - Z_3 \alpha_3} \sim \frac{E_1}{E_3}$$

where $A_1$ and $A_2$ are the cross-sections of the first and second beams 1, 2, respectively, and $\alpha_1$ and $\alpha_3$ are the coefficients of expansion, $E_1$ and $E_3$ are the moduli of elasticity, and $Z_1$ and $Z_3$ are the lengths of the first and third beams 1, 3, respectively.

Th present embodiment corresponds to claim 13.

Figure 14:
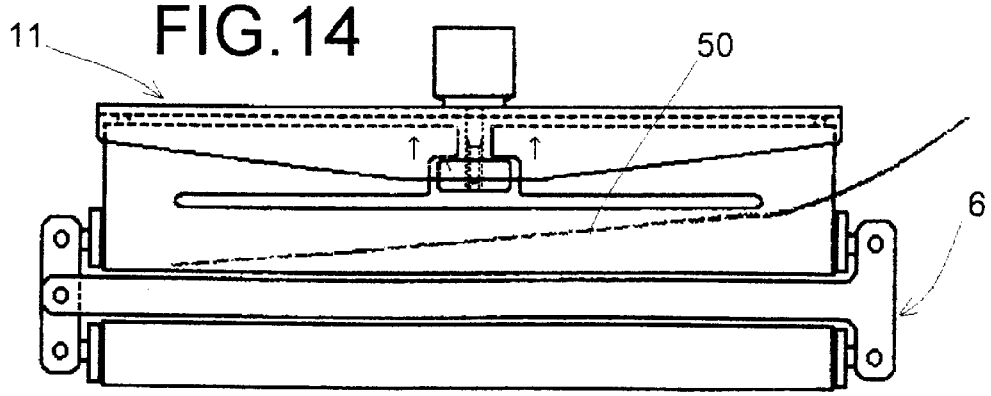
FIG. 14 shows the temperature compensator illustrated in FIG. 13, combined with the straight beam illustrated in FIG. 1.

FIG. 14 illustrates a case where the temperature compensator 6 proposed in the present embodiment is applied to the beam 11 provided with arms 12 raised in the first embodiment (see FIG. 1).

It may be preferable to provide an adjuster somewhere in the temperature compensator 6 to absorb errors in various constants as modulus of elasticity, coefficient of expansion or cross-sections of the beams 1 and 2 used for calculating the required cross-section $A_3$ of the beam 3, or the play in the balancer 5. An adjuster may be an adjustable pin for connecting the third beam 3 to adjust its location to the balancer 5.

Tenth Embodiment

In the tenth embodiment of the device according to the present invention, a straight beam with a temperature compensating function in itself is proposed.

FIG. 15A illustrates a device in which the straight beam 10 proposed in the present embodiment is combined with the arms 22 and the screw-nut arrangement 26 which are the same as those in the second embodiment.

As illustrated in FIG. 15B, the beam 10 is formed by joining together a first flat layer 8 having a greater expansion coefficient and a thickness $h_p$ and a second flat layer 9 having a rectangular cross-section of thickness $h_q$, with a boundary surface directed vertically. The optical fiber 50 with gratings is fixed on the outside surface of the second flat layer 9 on the back of the first flat layer 8, extending straight when the beam 10 is not loaded with the external force, from the top side at one end to the bottom side at the other end of the outside surface of the second flat layer 9, penetrating on its way the neutral surface of the beam 10.

At an elevated temperature, the thermal expansion of the first flat layer 8, which is greater than that of the second flat layer 9, produces a warp in the second flat layer 9. As a result, the outside surface of the second flat layer 9 on the back of the first flat layer 8 is subjected to compression. When the thermal expansion of the second flat layer 9 in itself balances with the compression provided by the first flat layer 8, the length measured on the outside surface of the second flat layer 9 may remain unchanged, by appropriately choosing the ratio of thicknesses $h_q/h_p$ of the first and second flat layers 8, 9.

FIG. 15C is a graph used for obtaining the ratio of thicknesses $h_q/h_p$ satisfying the requirement stated in the above. When the ratio of the thermal expansion coefficients of the first and second flat layers 8, 9 is known, the ratio of thicknesses $h_q/h_p$ can readily be obtained.

The present embodiment corresponds to claim 14.

Eleventh Embodiment

In the eleventh embodiment of the device according to the present invention, a device in which a relatively small bending force applied to the straight beam can produce a stress of sufficient magnitude working on the optical fiber, is proposed.

The straight beam 11, 21 or 31 in the preceding embodiments has a rectangular or trapezoidal cross-section, which requires a relatively large force for bending. However, as it is preferable that the force required to bend the beam be as small as possible to obtain a stress of a sufficient magnitude working on the optical fiber, a substantially small cross-sectional area of the beam is desirable. As such, a straight beam with a cross-section of, for example, an L figure, a T figure, a half ellipse cut along the major axis, a flat triangle or the like, may be utilized. Such a cross-section is called as a "thin wall cross-section" in claim 15. Several examples of thin wall cross-sections are illustrated in FIG. 16.

In case of the beam 11, 21 or 31, the optical fiber 50 is buried deep in the substance of the beam. However, a beam 61 with the thin wall cross-section is required to provide a flat surface on the outside thereof, so that the optical fiber 50 can be fixed thereon, as there is little space to receive the optical fiber within the beam. Accordingly, the optical fiber is fixed on the outside surface by adhesion, or laying in a shallow groove formed in the surface.

The optical fiber 50, fixed on the outside surface of the straight beam 61 can provide gratings of uniform interval, or those chirped in advance at a predetermined rate of interval change, when no bending force is applied to the beam.

The present embodiment corresponds to claims 15, 16 and 17.

Twelfth Embodiment

In the twelfth embodiment of the device according to the present invention, a case in which the band-pass filter, proposed in the eighth embodiment, is realized in the optical fiber 50 fixed on the outside surface of the straight beam 61 having the thin wall cross-section, is proposed (not illustrated).

The beam 61 has a vertically symmetric cross-section, and the neutral surface of the beam intersects the optical fiber 50 at the mid-point thereof, and while the optical fiber 50 has no grating in a central section of a predetermined length, which is symmetric with respect to the mid-point, a pair of sections with equal lengths abutting on both sides of the central section respectively provide the gratings of uniform interval, or those having been chirped in advance at a predetermined rate of interval change over the entire effective length of the optical fiber 50 including the central section, when the beam 61 is not loaded with the external force.

The present embodiment corresponds to claims 18 and 19.

Thirteenth Embodiment

In the thirteenth embodiment of the device according to the present invention, a method for producing the device is proposed (not illustrated), which comprises a first step of stretching the optical fiber 50 along a path in a mold cavity which the optical fiber 50 in a completed beam 11 or 21 will occupy, and/or placing the flexible flat heaters 32 at respective locations in the mold cavity which the flexible flat heaters 32 in the completed beam 31 will occupy, and a second step of pouring plastic liquid into the mold.

The device according to the present invention is characterized in that the optical fiber 50 is buried deep in the substance of the beam 11, 21 or 31. One way of realizing this condition is the molding method proposed in the above.

Materials used in the molding method may be various thermoplastic resins or thermosetting resins. The beams 11 or 21 provided with the arms 12 or 22 proposed in the first and second embodiments, or the beam 31 provided with the flexible flat heaters 32 proposed in the third embodiment, can be formed in a unified body by the molding method proposed in the present embodiment.

The present embodiment corresponds to claims 20 and 21.

Fourteenth Embodiment

In the fourteenth embodiment of the device according to the present invention, a method for producing the device according to claim 15 is proposed, which comprises: a first step of fixing a plain optical fiber 50 without gratings on the outside surface of the beam 61, a second step of fixing a photomask over the optical fiber 50, which is capable of forming gratings of uniform interval over the entire effective length of the optical fiber 50, a third step of applying a pair of bending moments Mv of a predetermined strength to keep the beam 61 bent (see FIG. 17) or not applying the bending moments, and a fourth step of irradiating ultra-violet rays via the photomask onto the optical fiber 50 to form the gratings.

The present embodiment corresponds to claims 22 and 23.

Fifteenth Embodiment

In the fifteenth embodiment of the device according to claim 15, another a method for producing the device according to claim 15 is proposed, which comprises a first step of fixing a plain optical fiber 50 without gratings on the outside surface of the beam 61, a second step of fixing a photomask over the optical fiber 50, capable of forming gratings of uniform interval over the entire effective length thereof, a third step of shading the photomask on the central region of the optical fiber 50 from light, a fourth step of applying a pair of bending moments Mv of a predetermined strength to keep the beam 61 bent (see FIG. 17), or not applying the bending moments, and a fifth step of irradiating ultra-violet rays via the shade and the photomask onto the optical fiber to form the gratings.

The present embodiment corresponds to claims 24 and 25.

What is claimed is:

1. A device for adjustable chirping in-fiber Bragg gratings, comprising:
   a straight beam with a longitudinally uniform cross-section, uniformly bent by an external force in a vertical plane including the axis of the beam and
   an optical fiber provided with gratings, extending straight along said vertical plane in the beam when the beam is not loaded with the external force, from the top surface at one end to the bottom surface at the other end of the beam, penetrating on its way the neutral surface of the beam:
   a pair of arms, each extending parallel to the beam from respective ends in the same directions to the center of the beam in said vertical plane, having respectively one tip facing the other at the center of the beam, and
   a mechanism for moving said tips toward or away from the beam thereby bending the beam, which comprises a screw-nut arrangement and a motor, mounted at the center of a yoke, placed apart from the arms between a pair of protrusions provided at the respective joints of the arms.

2. A device according to claim 1, wherein, in forming said gratings, the bottom values in the periodical variations of the refractive index in the optical fiber core are gradually increased approaching the end of the gratings on the shorter wave-length side, while the top values in the refractive index variations are maintained constant, thereby increasing the spatial average of the refractive index in the vicinity of said end to a value higher than that in the rest of the optical fiber core.

3. A device according to claim 1,
   wherein two optical fibers are fixed in said beam, each provided with gratings of uniform interval capable of reflecting light of a wave-length different from the other, said optical fibers being laid parallel and symmetrically with respect to a vertical plane including the axis of the beam, each extending straight when the beam is not loaded with the external force, from the top surface at one end to the bottom surface at the other end of the beam, penetrating on its way the neutral surface of the beam, and,
   wherein said beam is provided with the arms in both said vertical plane and a horizontal plane including the axis of the beam, so that said beam is bent by forces generated by the arms in the vertical and horizontal planes, respectively.

4. A device according to claim 1,
   wherein a multiplicity of optical fibers are fixed in said beam, each provided with the gratings of uniform interval capable of reflecting light of a wave-length different from that of the next one by a predetermined value in the other of arrangement, and
   wherein said optical fibers are laid in the beam close but not in contact with each other, each optical fiber extending straight when the beam is not loaded with the external force, from the top surface at one end to the bottom surface at the other end of the beam, penetrating on its way the neutral surface of the beam.

5. A device according to claim 1, further comprising two identical optical fibers fixed on the top and bottom surfaces of the beam, respectively, in addition to said optical fiber,
   wherein each optical fiber is provided with gratings of uniform interval capable of reflecting light of the same wave-length when the beam is not loaded with the external force.

6. A device according to claim 1,
   wherein said beam has a vertically symmetric cross-section, and the neutral surface of the beam intersects the optical fiber at the mid-point of the effective length thereof in the beam, and
   wherein, while a central section of the optical fiber with a predetermined length, which is symmetric with respect to said mid-point, provides no grating, a pair of sections of equal lengths abutting on both sides of said central section respectively provide the gratings of uniform interval when said beam is not loaded with the external force.

7. A device according to claim 1,
   wherein said beam has a vertically symmetric cross-section, and the neutral surface of the beam intersects the optical fiber at a mid-point of an effective length thereof in the beam, and
   wherein, while a central section of the optical fiber with a predetermined length, which is symmetric with respect to said mid-point, provides no grating, a pair of sections of equal lengths abutting on both sides of said central section respectively provide the gratings, having been chirped in advance at a predetermined rate of interval change over the entire effective length of the optical fiber including said central section, when said beam is not loaded with the external force.

8. A device according to claim 1, further comprising a temperature compensator to be combined with a first beam which is another name for said beam, which comprises:

a second beam which is the same as the first beam except for a cross-section larger than that of the first beam, and a third beam having a larger modulus of elasticity and a smaller coefficient of expansion than those of the first beam, wherein the first and second beams are arranged parallel on both sides of the third beam, in a plane including the axis of the third beam, with respective tips of the beams on the same end firmly tied to a tie-bar, and respective tips on the other end fixed so as to tilt to a balancer, and wherein the cross-section $A_3$ of the third beam is determined according to the following formula:

$$A_3 = \frac{2 \times A_1 Z_3 \alpha_1}{\frac{(A_2 - A_1)Z_1 \alpha_1}{2 \times A_2} - Z_3 \alpha_3} \times \{E_1/E_3\}$$

wherein $A_i$ is section area, $Z_i$ is length, $\alpha_i$ is thermal expansion coefficient, and $E_i$ is modulus of elasticity of each beam i (i=1, 2, 3).

9. A device according to claim 1, wherein said beam, having a longitudinally uniform rectangular cross-section, is formed by joining two parallel layers together, a first layer, and a second layer having an expansion coefficient greater than that of the first layer, with a boundary surface directed vertically, wherein said optical fiber is fixed on an outside surface of the first layer on the back of the second layer, extending obliquely straight from the top surface at one end to the bottom surface at the other end of the beam, when the beam is not loaded with the external force, penetrating on its way the neutral surface of the beam, and wherein the ratio of thicknesses of respective layers is determined so that the length measured in said outside surface of the first layer is kept constant at any temperature.

10. A method of producing said device according to claim 1, comprising:

a first step of stretching the optical fiber along a path in a mold cavity, which the optical fiber will occupy in a completed beam, and a second step of pouring plastic liquid into the mold.

11. A device for adjustable chirping in-fiber Bragg gratings, comprising:

a straight beam with a longitudinally uniform cross-section, uniformly bent by an external force in a vertical plane including the axis of the beam, and an optical fiber provided with gratings, extending straight along said vertical plane in the beam when the beam is not loaded with the external force, from the top surface at one end to the bottom surface at the other end of the beam, penetrating on its way the neutral surface of the beam:

a pair of arms, each extending in said vertical plane, perpendicularly to the beam from the respective ends of the beam in the same direction, each having a length L calculated from a second moment of inertia around the neutral axis I, a section area of the beam A, a thickness of the beam h, and a height of the neutral surface in the beam e, according to the following formula:

$$L = I/\{A(h/2 - e_1)\}$$

and, a mechanism for adjusting the distance between the tips of the arms thereby bending the beam, which comprises a screw-nut arrangement mounted on, and placed between, the tips of the arms, and a motor.

12. A device according to claim 11, wherein, in forming said gratings, the bottom values in the periodical variations of the refractive index in the optical fiber core are gradually increased approaching the end of the gratings on the shorter wave-length side, while the top values in the refractive index variations are maintained constant, thereby increasing the spatial average of the refractive index in the vicinity of said end to a value higher than that in the rest of the optical fiber core.

13. A device according to claim 11, wherein two optical fibers are fixed in said beam, each provided with gratings of uniform interval capable of reflecting light of a wave-length different from the other, said optical fibers being laid parallel and symmetrically with respect to a vertical plane including the axis of the beam, each extending straight when the beam is not loaded with the external force, from the top surface at one end to the bottom surface at the other end of the beam, penetrating on its way the neutral surface of the beam, and, wherein said beam is provided with the arms in both said vertical plane and a horizontal plane including the axis of the beam, so that said beam is bent by forces generated by the arms in the vertical and horizontal planes, respectively.

14. A device according to claim 11, wherein a multiplicity of optical fibers are fixed in said beam, each provided with the gratings of uniform interval capable of reflecting light of a wave-length different from that of the next one by a predetermined value in the other of arrangement, and wherein said optical fibers are laid in the beam close but not in contact with each other, each optical fiber extending straight when the beam is not loaded with the external force, from the top surface at one end to the bottom surface at the other end of the beam, penetrating on its way the neutral surface of the beam.

15. A device according to claim 11, further comprising two identical optical fibers fixed on the top and bottom surfaces of the beam, respectively, in addition to said optical fiber, wherein each optical fiber is provided with gratings of uniform interval capable of reflecting light of the same wave-length when the beam is not loaded with the external force.

16. A method of producing said device according to claim 11, comprising:

a first step of stretching the optical fiber along a path in a mold cavity, which the optical fiber will occupy in a completed beam, and a second step of pouring plastic liquid into the mold.

17. A device for adjustable chirping in-fiber Bragg gratings, comprising:

a straight beam with a longitudinally uniform cross-section, uniformly bent by an external force in a vertical plane including the axis of the beam, and an optical fiber provided with gratings, extending straight along said vertical plane in the beam when the beam is not loaded with the external force, from the top surface at one end to the bottom surface at the other end of the beam, penetrating on its way the neutral surface of the beam:

wherein said beam is made of a heat-resistant plastic, covered with flexible flat heaters on the top and bottom surfaces of the beam, and wherein each of said flexible heaters is supplied with electric power independently from the other to provide different temperatures to the respective surfaces of the beam, thereby thermally bending the beam.

18. A method of producing said device according to claim 17, comprising:

a first step of stretching said optical fiber along a path in a mold cavity, which the optical fiber will occupy in a completed beam, a second step of placing said flexible flat heaters at respective positions in the mold cavity, which the flexible flat heaters will occupy in the completed beam, and a third step of pouring plastic liquid into the mold.

19. A device according to claim 17, wherein, in forming said gratings, the bottom values in the periodical variations of the refractive index in the optical fiber core are gradually increased approaching the end of the gratings on the shorter wave-length side, while the top values in the refractive index variations are maintained constant, thereby increasing the spatial average of the refractive index in the vicinity of said end to a value higher than that in the rest of the optical fiber core.

20. A device according to claim 17, wherein a multiplicity of optical fibers are fixed in said beam, each provided with the gratings of uniform interval capable of reflecting light of a wave-length different from that of the next one by a predetermined value in the other of arrangement, and wherein said optical fibers are laid in the beam close but not in contact with each other, each optical fiber extending straight when the beam is not loaded with the external force, from the top surface at one end to the bottom surface at the other end of the beam, penetrating on its way the neutral surface of the beam.

21. A device according to claim 17, further comprising two identical optical fibers fixed on the top and bottom surfaces of the beam, respectively, in addition to said optical fiber, wherein each optical fiber is provided with gratings of uniform interval capable of reflecting light of the same wave-length when the beam is not loaded with the external force.

22. A device according to claim 17, wherein said beam has a vertically symmetric cross-section, and the neutral surface of the beam intersects the optical fiber at the mid-point of the effective length thereof in the beam, and wherein, while a central section of the optical fiber with a predetermined length, which is symmetric with respect to said mid-point, provides no grating, a pair of sections of equal lengths abutting on both sides of said central section respectively provide the gratings of uniform interval when said beam is not loaded with the external force.

23. A device according to claim 17, wherein said beam has a vertically symmetric cross-section, and the neutral surface of the beam intersects the optical fiber at a mid-point of an effective length thereof in the beam, and wherein, while a central section of the optical fiber with a predetermined length, which is symmetric with respect to said mid-point, provides no grating, a pair of sections of equal lengths abutting on both sides of said central section respectively provide the gratings, having been chirped in advance at a predetermined rate of interval change over the entire effective length of the optical fiber including said central section, when said beam is not loaded with the external force.

24. A device for adjustable chirping in-fiber Bragg gratings comprising:

a straight beam with a vertically symmetric and longitudinally uniform thin wall cross-section, provided with at least a flat surface on an outside thereof, uniformly bent by an external force in a plane, which is parallel with said flat surface, including the axis of the beam, and an optical fiber provided with gratings, fixed on said flat surface of the beam, extending straight, when the beam is not loaded with the external force, from the top side at one end to the bottom side at the other end of said flat surface, penetrating on its way the neutral surface of the beam;

wherein the neutral surface of the beam intersects the optical fiber at the mid-point of the effective length thereof in the beam, and wherein, while a central section of the optical fiber with a predetermined length, which is symmetric with respect to said mid-point; provides no grating, a pair of sections of equal lengths abutting on both sides of said central section respectively provide identical gratings of uniform interval, when said beam is not loaded with the external force.

25. A device for adjustable chirping in-fiber Bragg gratings according to claim 18, wherein, said pair of sections respectively provide the gratings, having been chirped in advance at a predetermined rate of interval change over the entire effective length of the optical fiber including said central section, when said beam is not loaded with the external force.

26. A method of producing said device according to claim 25, comprising:

a first step of fixing a plain optical fiber without gratings on said outside plane of the beam, a second step of fixing a photomask capable of forming the gratings of uniform interval over the entire effective length of the optical fiber, a third step of fixing a shade over the photomask for shading said central section of the optical fiber from light, a fourth step of applying an external force of predetermined strength to keep the beam being bent, and a fifth step of irradiating ultra-violet rays via the shade and the photomask onto the optical fiber to form the gratings.

27. A method of producing said device according to claim 24, comprising:

a first step of fixing a plain optical fiber without gratings on said outside plane of the beam, a second step of fixing a photomask capable of forming the gratings of uniform interval over the entire effective length of the optical fiber, a third step of fixing a shade over the photomask, for shading said central section of the optical fiber from light, and a fourth step of irradiating ultra-violet rays via the shade and the photomask onto the optical fiber to form the gratings.

28. A method of producing a device for adjustable chirping in-fiber Bragg gratings, wherein said device has a straight beam with a vertically symmetric and longitudinally uniform thin wall cross-section, provided with at least a flat surface on an outside thereof, uniformly bent by an external force in a plane, which is parallel with said flat surface, including the axis of the beam, comprising:

a first step of fixing a plain optical fiber without gratings on said flat surface of the beam, extending straight, when the beam is not loaded with the external force, from the top side at one end to the bottom side at the other end of said flat surface, penetrating on its way the neutral surface of the beam:

a second step of fixing a photomask over the optical fiber capable of forming the gratings of uniform interval over the entire effective length of the optical fiber, and a third step of irradiating ultra-violet rays via the photomask onto the optical fiber to form the gratings.

29. A method of producing said device according to claim 28, wherein a step of applying an external force of predetermined strength to keep the beam bent is executed between said second and third steps.

* * * * *

UNITED STATES PATENT AND TRADEMARK OFFICE
CERTIFICATE OF CORRECTION

PATENT NO. : 6,633,702 B2
DATED : October 14, 2003
INVENTOR(S) : Hiroyuki Hoshino It is certified that error appears in the above-identified patent and that said Letters Patent is hereby corrected as shown below:

Column 11,
Lines 1-4, change the mathematical formula "$A_3 = \dfrac{2 \sim A_1 Z_3 \alpha_1}{\dfrac{(A_2 - A_1) Z_1 \alpha_1}{2 \sim A_2} - Z_3 \alpha_3} \sim \dfrac{E_1}{E_3}$"

into -- $A_3 = \dfrac{2 \times A_1 Z_3 \alpha_1}{\dfrac{(A_2 - A_1) Z_1 \alpha_1}{2 \times A_2} - Z_3 \alpha_3} \times \dfrac{E_1}{E_3}$ --

Signed and Sealed this

Twentieth Day of April, 2004

JON W. DUDAS
*Acting Director of the United States Patent and Trademark Office*